May 21, 1957 J. J. McLAUGHLIN Re. 24,319

GRAVITY CONVEYER SECTION

Original Filed Jan. 14, 1947 3 Sheets-Sheet 1

Inventor
John J. McLaughlin
By
Harry Langsam
Attorney

GRAVITY CONVEYER SECTION
Original Filed Jan. 14, 1947 3 Sheets-Sheet 2
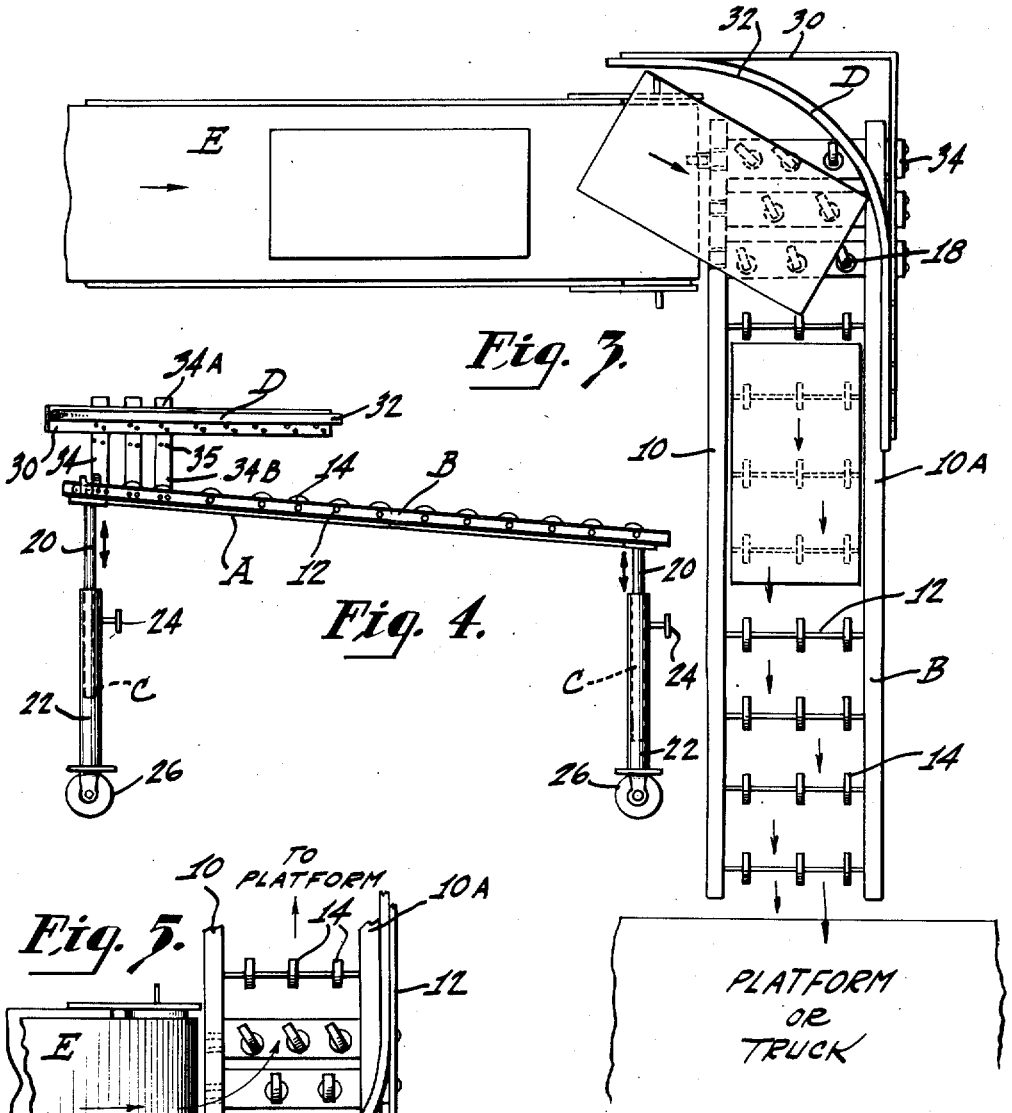
Fig. 3.
Fig. 4.
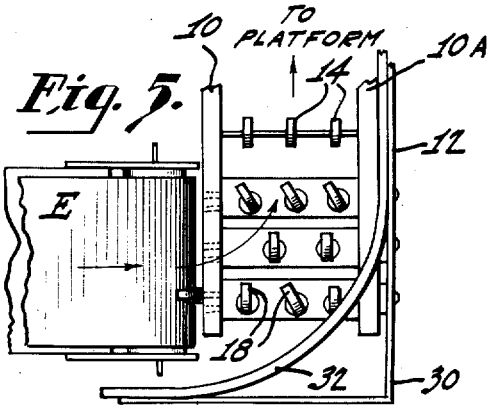
Fig. 5.
Inventor
John J. McLaughlin
By
Harry Langsam
Attorney GRAVITY CONVEYER SECTION
Original Filed Jan. 14, 1947 3 Sheets-Sheet 3
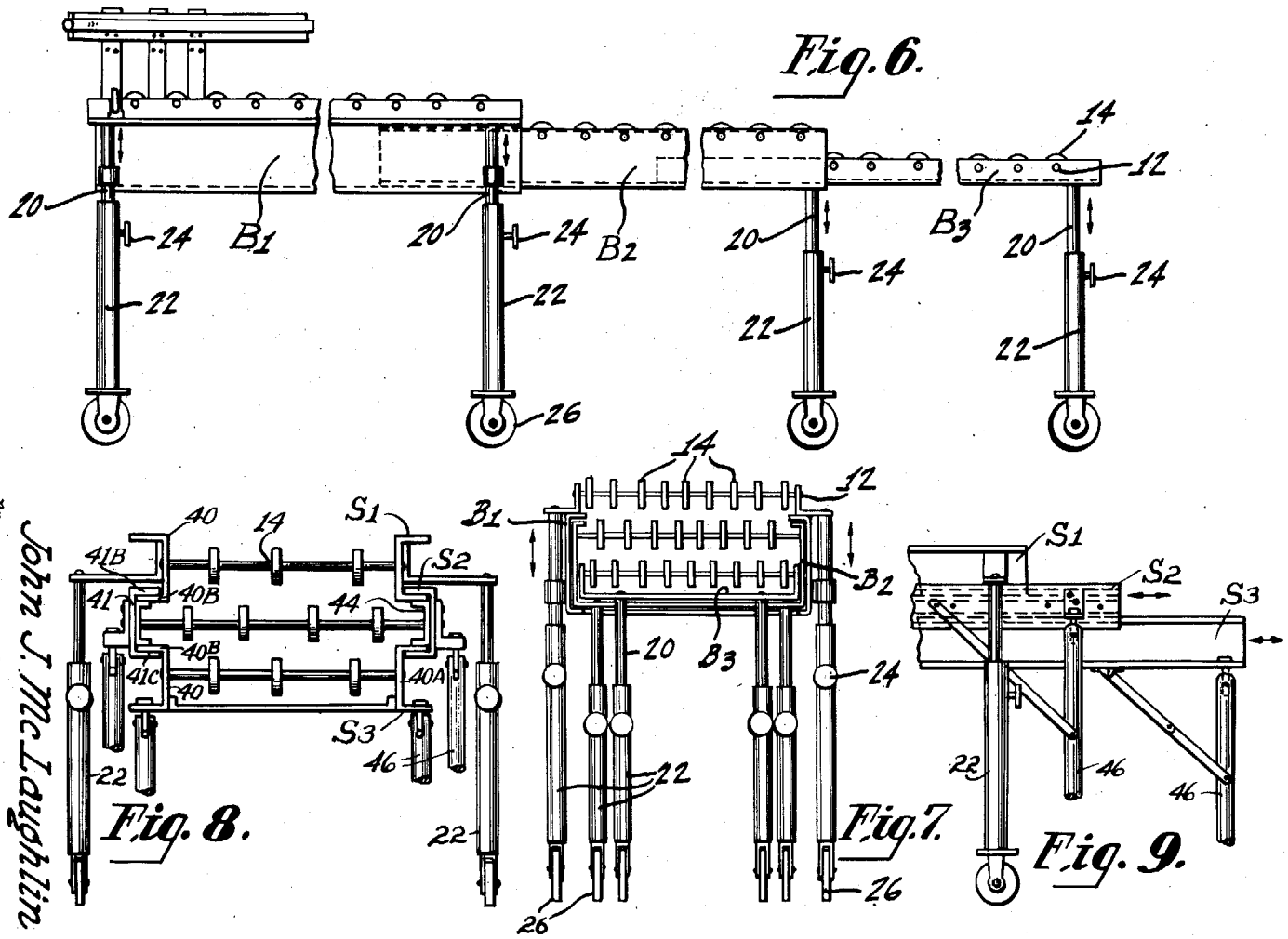
John J. McLaughlin
By Harry Sangeam
Attorney United States Patent Office Re. 24,319
Reissued May 21, 1957

24,319

GRAVITY CONVEYER SECTION

John J. McLaughlin, Upper Darby, Pa., assignor to The Wilkie Company, Philadelphia, Pa.

Original No. 2,613,789, dated October 14, 1952, Serial No. 721,909, January 14, 1947. Application for reissue October 14, 1954, Serial No. 462,638

5 Claims. (Cl. 193—35)

Matter enclosed in heavy brackets [ ] appears in the original patent but forms no part of this reissue specification; matter printed in italics indicates the additions made by reissue.

My invention relates to conveyor systems and deals particularly with an improved gravity conveyor section.

Gravity conveyor sections have been widely used in factories and in warehouses in conjunction with powered conveyor belts. Their applications include the loading and unloading of trucks and railway cars, the routing of packaged goods to and from storage areas, and the routing of articles within a manufacturing process.

When used in conjunction with powered conveyor belts in the applications cited above, the ordinary gravity conveyor section is deficient in several respects. The section has no provision for transferring goods onto or from the conveyor belt, and it has been necessary to station a man at the juncture of the conveyor section and the conveyor belt for this purpose. The sections, furthermore, are of a fixed length.

An object of my invention is to provide a mobile conveyor section and diverter which can sidetrack goods from any point along the length of a powered conveyor line, and which can also deliver goods to the conveyor line at any point.

Another object of my invention is to provide a mobile and extensible conveyor section, so that its length may be extended to the exact distance that the goods are to be conveyed.

Another object of my invention is to provide a mobile conveyor section and diverter which can divert and convey goods from a powered conveyor line directly to a vehicle or a storage area, or in the opposite direction.

Another object of my invention is to provide a mobile conveyor section and diverter, whereby new conveyor routes may be rapidly improvised within a factory, as when a manufacturing process is being developed or altered.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 3 is a top view of an embodiment of my gravity conveyor section arranged to relay goods from the end of a powered conveyor to a platform or truck.

Fig. 4 is a side elevation view of one embodiment of my invention.

Fig. 5 is a fragmentary top view of the conveyor section of Fig. 3 arranged to relay goods in a direction opposite to that of Fig. 3.

Fig. 6 is a side elevation of an extensible gravity conveyor in extended position.

Fig. 7 is an end view of the extensible gravity conveyor section illustrated in Fig. 6, the section being in its contracted position.

Fig. 8 is an end view of the preferred construction of my extensible conveyor.

Fig. 9 is a fragmentary side view of the extensible conveyor of Fig. 8.

Referring now in greater detail to the drawings wherein similar reference characters refer to similar parts, I show a mobile gravity diverter and conveyor section, generally designated as A.

The section comprises a bed and frame B, the supports C and a diverter D.

Figure 1:
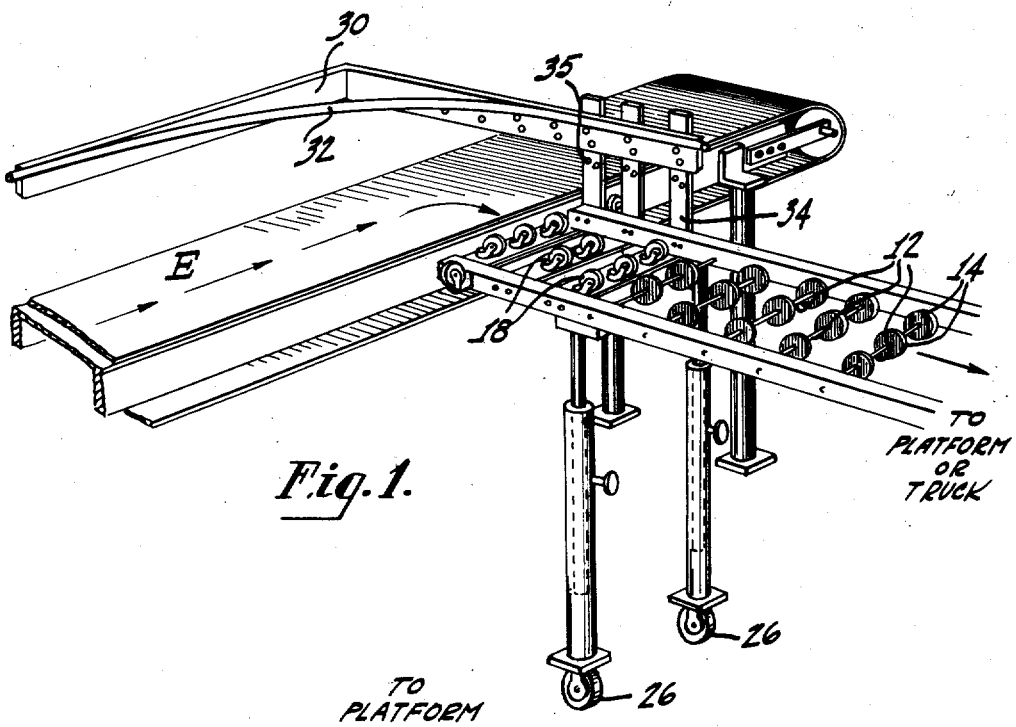
Fig. 1 is a fragmentary perspective view of an embodiment of my invention arranged to divert goods away from a point on a powered conveyor line.

The bed D consists of a pair of parallel frame members 10 and 10A, which are connected by a plurality of longitudinally spaced cross rods 12 having wheels 14 thereon as commonly used to facilitate the passage of packaged goods. At the forward or diverter end of the bed, the cross-rods 12 bear casters 18 to facilitate the change in direction of a [packgae] *package* which is being diverted onto or off the section. The supports C are telescopic so as to enable the bed to be raised to the desired elevation and degree of inclination. For example, in the application shown in Fig. 1, where the section is used to divert packages from a conveyor belt onto a platform or truck, the diverter end is raised until the tops of the casters 18 are level with the conveyor belt, which is generally designated as E. The other end of the section B is lowered below the level of the diverter end so that the packages will move by gravity to their destination. The telescopic supports C consist of a vertically extending pipe or rod 20, the upper end of which is secured to the frame members 10 and 10A. The lower end slides within another pipe 22, and can be locked at any desired height by the handscrew 24 threaded into the wall of the outer pipe 22.

The lower ends of the supports are provided with wheels 26 making the section easy to move about as desired.

The diverter member D consists of a right angle frame 30 and an arcuate diverter rod 32, the members 30 and 32 being welded together at their ends. A number of uprights 34 are adapted to fasten to either side of the section at one end 34B and are adapted to clamp the diverter at the other end 34A, by means of quick-detachable bolts. Additional braces (not shown) may be used to strengthen the support of the diverter member D.

A number of holes 35 are provided in the uprights so that the diverter may be supported at various heights above the bed depending on the size of the packages which are being conveyed.

Figure 2:
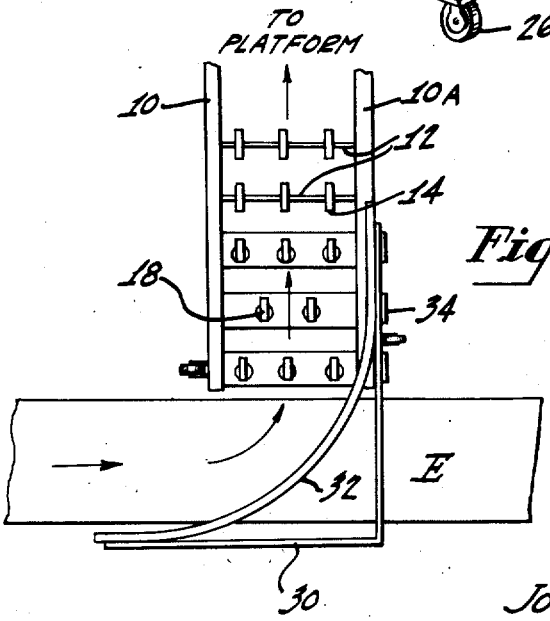
Fig. 2 is a fragmentary top view of an embdiment of my invention wherein the diverter is arranged to sidetrack materials coming from a direction opposite to that of Fig. 1.

In order to adapt the diverter for a conveyor belt traveling in an opposite direction, shown in Fig. 2, the uprights are transferred to the other side of the section and the diverter is bolted to the opposite side of the uprights.

Since either end of the section can be elevated, it is apparent that the section can be used to deliver goods to the powered conveyor belt, as well as to remove goods from the belt.

In a modification of my invention, shown in Figs. 6 and 7, the bed is made extensible, so that its length may be increased several times. This enables my conveyor section to be extended to the exact distance between say, a conveyor belt and a truck bed, and reduces manual labor to a minimum.

In the modification, B1 is the main bed along which a pair of other beds is slidable. Also, in the pair, B3 is slidable along the other bed, B2. To increase the length of the conveyor section, the pair B2 and B3 is extended, to further increase the length, section B3 is extended from B2. The sections B2 and B3 possess leg supports only at their forward ends, the other ends being already contained and supported. Stops are provided at these other ends to prevent the sections from becoming separated. The extensible gravity section may be used with or without the deflector as desired, it being a simple matter to assemble or remove the deflector.

A preferred construction of my extensible conveyor is illustrated in Figs. 8 and 9. Here all of the sections are of approximately the same width.

The side channel members 40 of the alternate sections S1 and S3 have their open sides 40A on the exterior, forming outwardly-extending ledges 40B.

The intermediate section S2 is made with its side channels 41 reversed, so as to provide inwardly-extending ledges 41B and 41C. The ledges 41B of section S2 overlie the ledge 40B of the top section, so that in effect the section S2 hangs from the top section. Similarly, the ledges 40B of the lowest section S3 overlie the ledges 41C of the middle section S2, so that the lowest section depends from the middle section.

An additional channel member 44 is attached to the insides of the intermediate section channels 41 and serves to prevent the conveyor sections from separating accidentally.

The deflector end of the top section S1 is provided with legs 22 similar to those of Fig. 6.

The free ends of the lower sections S2 and S3 have telescopic hinged legs 46 which fold along the sides of the sections when not in use.

Although I have shown a conveyor consisting only of three sections, it is obvious that the conveyor can be made with additional sections in the same manner.

Although my invention has been described in considerable detail, such description is intended as being illustrative rather than limiting, since the invention may be variously modified, and the scope of the invention is to be determined as claimed.

I claim as my invention:

*1.* In an extensible gravity conveyor, a plurality of telescopic conveyor sections, one being the main conveyor and the other a telescopic section, each section comprising side frame channel members, rotatable wheels carried by cross-members between said channel members, said channel members of one section being oppositely disposed and interfitting with the channel section of its adjacent section whereby the sections may be telescoped to any desired length, a flange of one side section lying upon the flange of said other section, the upper flange of the lowermost section being above and in engagement with the lowermost flange of the upper section, and the lowermost section being solely supported by said flange of the upper section both when collapsed and when in open position, ground elevating means at each end of the main conveyor section, and ground elevating means at only one end of said telescopic conveyor section.

*2. In a gravity conveyor, an independently self-stable first conveyor section and a plurality of other conveyor sections which together with the first said section form a series, said independently self-stable first conveyor section having supporting ground wheels at both ends thereof, supporting legs at both ends thereof mounted on the respective wheels, and a body extending from end to end, mounted on the legs, having a conveyor surface made up of a plurality of rollers, and having support surfaces for the near end of the next section in the series, said next section having supporting ground wheels at the far end thereof, supporting legs on the ground wheels and a body having a conveyor surface made up of a plurality of rollers, having its far end mounted on the legs, having its near end supported in longitudinally movable relation by the support surfaces of the first section and having support surfaces for the near end of the next succeeding section, said next succeeding section having ground wheels at its far end, legs supported thereby, a body supported at its far end by the legs, and at its near end by the supporting surfaces of the preceding section, said body having a conveyor surface made up of a plurality of rollers and the said conveyor surfaces of the different sections being mounted at succeeding different levels and adapted to telescope into a position one over the other.*

*3. A gravity conveyor comprising an independently self-supporting first roller-surfaced conveyor section having supporting ground wheels on supporting legs at both ends of the section, and a plurality of auxiliary roller-surfaced conveyor sections for successively lower heights, said sections collectively forming a series with said first conveyor section the first of said series, and each of which auxiliary conveyor sections is supported by the immediately preceding section in the series at its near end and supports itself on supporting wheels on supporting legs at the other end of the section, and each of the auxiliary sections of which is adapted to telescope under the preceding section in the series.*

*4. A gravity telescopic conveyor comprising an independently stable main conveyor section of fixed length and having a frame having two longitudinal side members, rollers serving as conveyor surface in a plurality of longitudinal positions and rotating on lateral axes which are between said members and are located below the tops of said members, supporting legs on supporting wheels for the conveyor at each of the four corners thereof, and longitudinal support strips extending horizontally from and supported by said longitudinal side members, and a plurality of auxiliary conveyor sections each having a frame having longitudinal side members, rollers serving as conveyor surface in a plurality of longitudinal positions and rotating on lateral axes which extend across between said side members and are located below the tops of said members, longitudinal support strips attached to and extending horizontally from said side members in at least all but the last of said auxiliary sections, support means on the near end of each of said auxiliary sections for supporting said end on the support strip of the adjacent section, and legs and ground wheels supporting the far end of each of said sections, said main conveyer section and said auxiliary conveyor sections each having its conveyor surface completely below that of the preceding section and having its conveyor surface sloping downward in the direction toward the auxiliary sections in the case of the main section and in the direction away from the main section in the case of the auxiliary sections.*

*5. A gravity conveyor comprising an independently self-supporting first conveyor section having supporting ground wheels on supporting legs at both ends of the section and a plurality of auxiliary conveyor sections, said sections collectively forming a series with said first conveyor section the first of said series, each of which auxiliary conveyor sections is supported by the immediately preceding section in the series at its near end, supports itself on supporting wheels on supporting legs at the other end of the section, is adapted to telescope under the preceding section in the series, and has as its sole conveyor surface a series of rollers distributed in their several locations among a plurality of different longitudinal positions, the conveyor surface of each successive one of the series being lower than that of the preceding one.*

References Cited in the file of this patent or the original patent

UNITED STATES PATENTS 1,045,939 Brotz ---------- Dec. 3, 1912

(Other references on following page)

| | | |
|---|---|---|
| 1,778,267 | McArthur | Oct. 14, 1930 |
| 1,935,734 | Twomley | Nov. 21, 1933 |
| 1,949,972 | Murphy | Mar. 6, 1934 |
| 1,959,735 | Phillips | May 22, 1934 |
| 2,242,206 | Bisset | May 20, 1941 |
| 2,384,959 | Pearson | Sept. 18, 1945 |
| 2,479,823 | Ernst | Aug. 23, 1949 |

FOREIGN PATENTS

| | | |
|---|---|---|
| 517,237 | France | Dec. 16, 1920 |
| 340,620 | Germany | Sept. 15, 1921 |
| 440,562 | Germany | Feb. 9, 1927 |
| 626,773 | Germany | Mar. 2, 1936 |